US012672728B2

(12) United States Patent
Lin

(10) Patent No.: US 12,672,728 B2
(45) Date of Patent: Jul. 7, 2026

(54) RETRACTABLE BABY GATE

(71) Applicant: Ningbo Kony Metal Products Co., Ltd, Cixi (CN)

(72) Inventor: Guowen Lin, Fuqing (CN)

(73) Assignee: Ningbo Kony Metal Products Co, Ltd., Cixi (CN)

(*) Notice: Subject to any disclaimer, the term of this patent is extended or adjusted under 35 U.S.C. 154(b) by 0 days.

(21) Appl. No.: 19/094,082

(22) Filed: Mar. 28, 2025

(65) Prior Publication Data

US 2025/0302213 A1 Oct. 2, 2025

(30) Foreign Application Priority Data

Mar. 31, 2024 (CN) ........................ 202420641924.9
Jan. 3, 2025 (CN) ........................ 202520013286.0
Mar. 20, 2025 (CN) ........................ 202520493506.4

(51) Int. Cl.
*E06B 9/00* (2006.01)
*A47G 5/02* (2006.01)

(52) U.S. Cl.
CPC .......... *A47G 5/02* (2013.01); *E06B 2009/002* (2013.01)

(58) Field of Classification Search
CPC ............. E06B 2009/002; E06B 9/0692; E06B 2009/543; E01F 13/022; A47G 5/02
See application file for complete search history.

(56) References Cited

U.S. PATENT DOCUMENTS 3,875,623 A * 4/1975 Johnston .................. A41F 1/00 24/305
8,881,787 B2 * 11/2014 Wang ..................... E06B 11/04 160/24
8,887,441 B2 * 11/2014 Lundh ..................... E06B 9/08 49/55
9,598,896 B1 * 3/2017 Pichik ..................... E06B 9/13
D1,050,489 S * 11/2024 Wang ......................... D25/48.8
2010/0307700 A1 * 12/2010 Wang ..................... E06B 9/40 160/264
2017/0009518 A1 * 1/2017 Carter ..................... E06B 9/01
2018/0044868 A1 * 2/2018 Miller .................. E01F 13/028
2023/0075611 A1 * 3/2023 Wang ..................... E06B 9/90
2023/0151643 A1 * 5/2023 Huang ............... E05B 65/0014 160/304.1
2023/0366269 A1 * 11/2023 Wang ..................... E06B 9/60
2024/0125150 A1 * 4/2024 Wang ................. E05B 65/0014
2024/0344386 A1 * 10/2024 Wang ..................... E06B 9/13

* cited by examiner

*Primary Examiner* — Abe Massad

(57) ABSTRACT

The disclosure belongs to the field of gates and discloses a retractable baby gate. The retractable baby gate includes at least a piece of gate fabric; a roller, mounted on one side of the gate fabric, wherein a rolling shaft is coaxially arranged in the roller, one end of the gate fabric is fixed to the rolling shaft and winds the periphery of the rolling shaft, a longitudinal opening through which the gate fabric comes in and goes out is formed in the peripheral surface of the roller, a shell is fixedly connected to the upper end of the roller, and a base fixedly connected to a mounting fixed surface is connected to the lower end of the shell; and a control portion, arranged in the shell to control rotation and locking of the rolling shaft, wherein the control portion includes a gear coaxially connected to the rolling shaft.

5 Claims, 11 Drawing Sheets

RETRACTABLE BABY GATE

CROSS-REFERENCE TO RELATED APPLICATIONS

This application claims priorities from the Chinese patent applications 2024206419249 filed Mar. 31, 2024, 2025200132860, filed Jan. 3, 2025, and 2025204935064, filed Mar. 20, 2025, the content of which are incorporated herein in the entirety by reference.

TECHNICAL FIELD

The disclosure belongs to the field of gates, in particular to a retractable baby gate.

BACKGROUND

A fabric gate is arranged at a doorway or an exit of a certain local space in a room to prevent pets or infants indoors or in the local space from going out arbitrarily, so as to protect their safety.

An existing fabric gate is of a fixed structure and can only wind the periphery of a column to be stored. Since a fixed end is arranged on the column, a projection or an ejected mark is easily ejected on the wound fabric gate by the fixed end. In long-term storage, the gate fabric of the fabric gate is easily destroyed. Furthermore, the existing gate is fixed in length and is only used for a doorway with fixed width, so that the gate is poor in applicability.

SUMMARY

An objective of the disclosure is to provide a retractable baby gate that is convenient to store and adjustable in extended length.

To achieve the above objective, the disclosure provides a retractable baby gate, including:

at least a piece of gate fabric;

a roller, mounted on one side of the gate fabric, where a rolling shaft is coaxially arranged in the roller, one end of the gate fabric is fixed to the rolling shaft and winds the periphery of the rolling shaft, a longitudinal opening through which the gate fabric comes in and goes out is formed in the peripheral surface of the roller, a shell is fixedly connected to the upper end of the roller, and a base fixedly connected to a mounting fixed surface is connected to the lower end of the shell; and a control portion, arranged in the shell to control rotation and locking of the rolling shaft, where the control portion includes a gear coaxially connected to the rolling shaft, a toothed structure capable of engaging with the gear is arranged on one side of the gear, one end of the toothed structure is rotationally connected to a bottom surface of the shell, and the toothed structure rotates relative to the coupling point to be close to or away from the gear;

the toothed structure engages with the gear to lock the rolling shaft, so as to prevent the rolling shaft from rotating, the toothed structure is separated from the gear, and the rolling shaft rotates to release or retract the gate fabric.

According to the disclosure, further, the toothed structure is rotationally connected to a bottom surface of the shell and rotates relative to the coupling point to be close to or away from the gear.

According to the disclosure, further, a switch that controls the toothed structure to rotate is connected to an upper surface of the toothed structure, the switch is arranged above the shell, a stopper is arranged at the bottom of the switch, a barrier plate is arranged at the top of the toothed structure, one end of the barrier plate extends horizontally to exceed a sawtooth starting end surface of the toothed structure, and the stopper falls to be in contact with a side surface of the barrier plate to drive the barrier plate to rotate toward a direction away from the gear, so as to prevent the toothed structure from engaging with the gear; and the switch is toggled reversely, the barrier plate loses an external force action, and the toothed structure rotates reversely along a turning point thereof till a sawtooth of the toothed structure engages with the gear.

According to the disclosure, further, a splicing rod is connected to an edge of one side of the gate fabric away from the roller, and a handle and a fixed seat are mounted on the periphery of the splicing rod.

According to the disclosure, further, there are a plurality of pieces of gate fabric, and two adjacent pieces of gate fabric are connected by the splicing rod; there is at least one splicing rod; and the splicing rod is provided with two symmetrically formed clamping cavities for clamping the gate fabric on the corresponding sides respectively, so as to splice two adjacent pieces of gate fabric into an integrated structure.

According to the disclosure, further, a strip-shaped connecting portion cooperating with the clamping cavities is formed at an edge of one side of the gate fabric connected to the splicing rod.

According to the disclosure, further, a splicing rod is connected to an edge of the last piece of gate fabric away from the roller, and a handle and a fixed seat are mounted on the periphery of the splicing rod.

According to the disclosure, further, a fixing part fixed with the ground is arranged at the bottom of the gate fabric, and there is at least one fixing part that prevents pets or infants from passing through.

According to the disclosure, further, at least one pet hole is formed in the gate fabric, a check apron is arranged at the pet hole, the check apron is lowered to shield the pet hole, the check apron is rolled, the pet hole appears, and blocked pets come in and go out from the pet hole.

According to the disclosure, further, the fixing part is a sucking disc, a magnetic structure or a double-sided adhesive.

The disclosure brings the following beneficial effects: according to the disclosure, one side of the gate fabric is fixed through the roller and the rolling shaft coaxially arranged therewith, and along with the rotation of the rolling shaft, the gate fabric winds the periphery of the rolling shaft, so that the gate fabric is retracted and released; in combination with the control portion to control the rotation or not of the rolling shaft, the retraction length of the gate fabric is adjustable, and the fabric gate is applicable to doorways with various widths, so that the application range of the fabric gate is expanded;

adjacent pieces of gate fabric are spliced by the splicing rods, and when not used, the fabric gate is detached to the minimum extent, so that the storage volume is reduced and the fabric gate is conveniently stored; and moreover, different numbers of gate fabric may be spliced according to the width of the mounted gate frame opening, so that the fabric gate is wide in applicability.

The pet hole is formed in the gate fabric for the convenience of pets to come in, and compared with a gate through which pets are released by detaching the connection between the gate and the fixed surface, the fabric gate is operated more conveniently.

100—gate fabric; 110—connecting portion; 120—pet hole; 200—roller; 210—longitudinal opening; 220—base; 230—rolling shaft; 300—splicing rod; 310—clamping cavity; 400—handle; 500—fixed seat; 600—shell; 610—connecting rod; 611—rotating handle; 612—lock sheet; 620—reinforcing rod; 700—gear; 710—toothed structure; 720—barrier plate; 800—switch; 810—stopper; 900—sucking disc; 1000—check apron.

DETAILED DESCRIPTION OF THE EMBODIMENTS

Specific embodiments of the disclosure will be further described below in conjunction with drawings. It is to be noted herein that the description of these embodiments is used to help understand the disclosure and does not constitute a limitation to the disclosure. Besides, technical features involved in the embodiments of the disclosure described below may be combined with each other as long as there is no conflict between each other.

Figure 1:
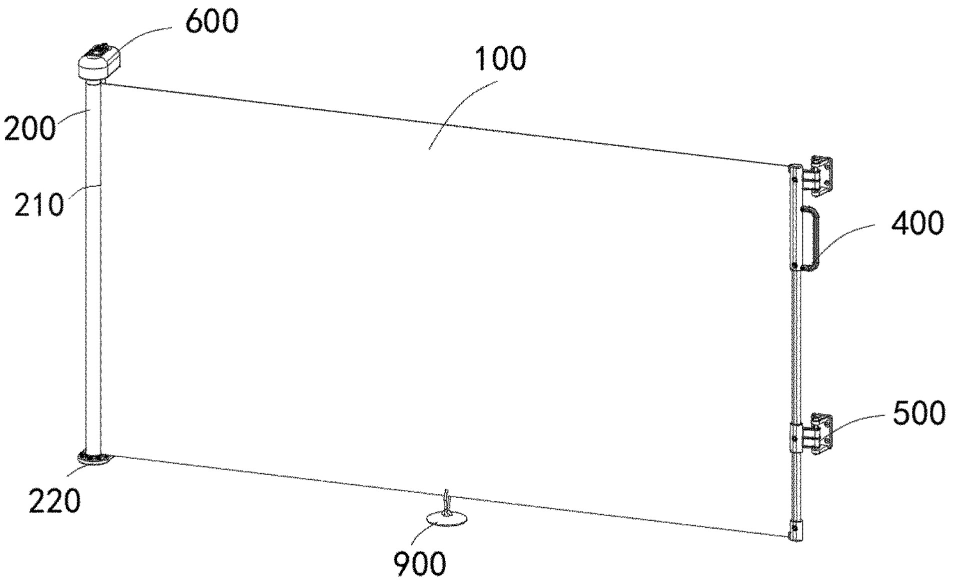
FIG. 1 is a schematic structural diagram (without a pet hole) of a single piece of gate fabric provided by the disclosure.
Figure 2:
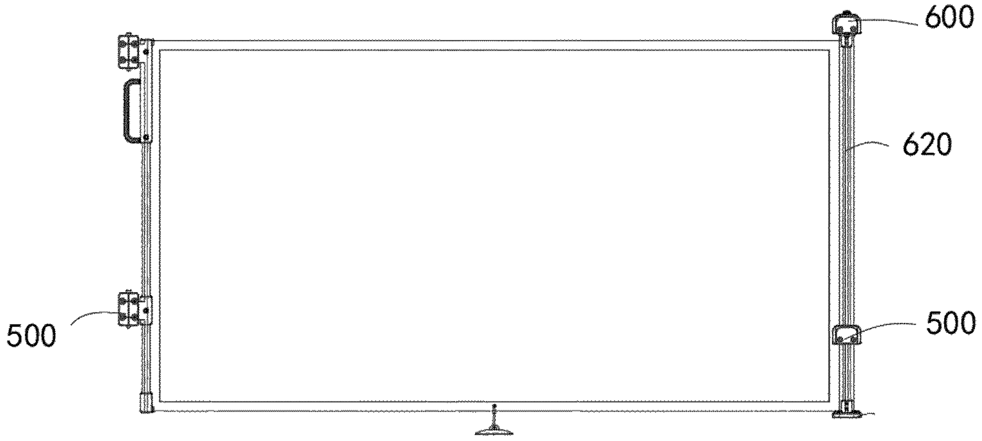
FIG. 2 is a schematic diagram of FIG. 1 at another viewing angle.
Figure 3:
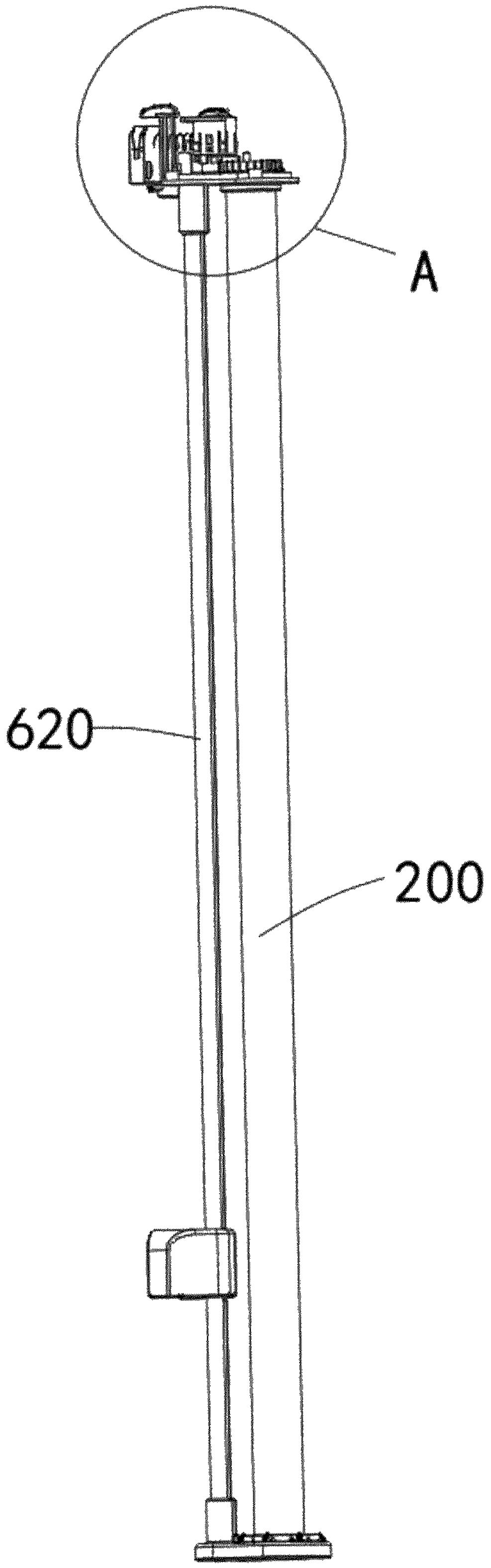
FIG. 3 is a schematic structural diagram of a connection between a roller and a shell provided by the disclosure.
Figure 4:
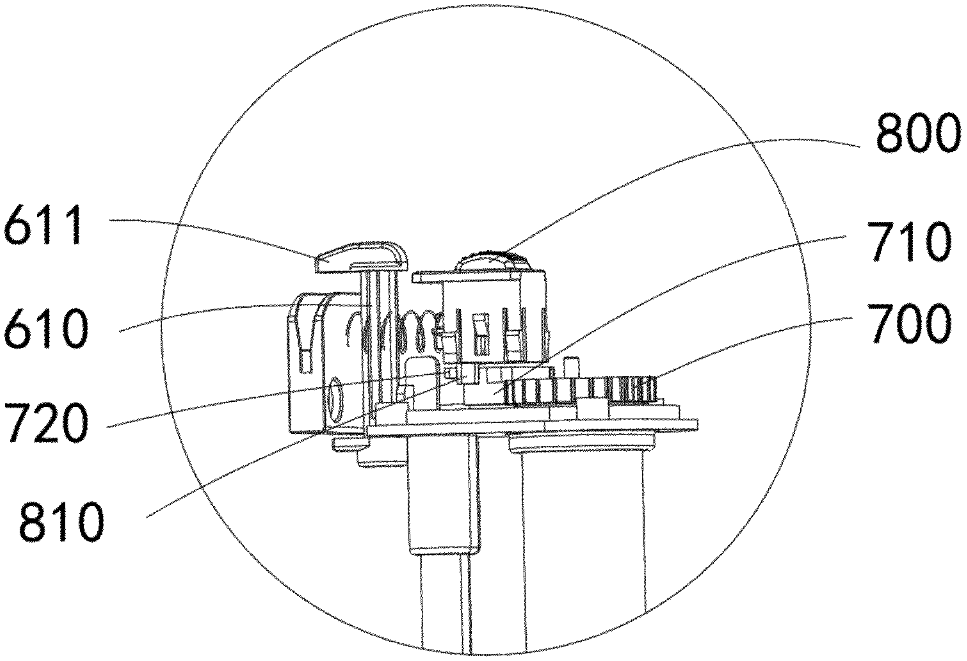
FIG. 4 is a partially enlarged view of A in FIG. 3.
Figure 5:
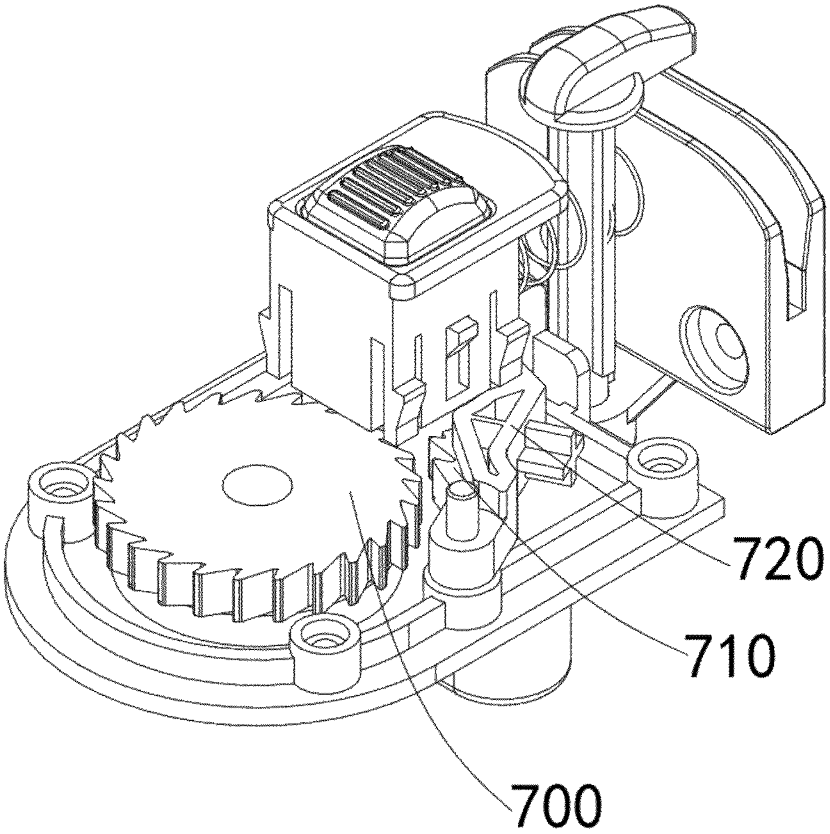
FIG. 5 is a schematic diagram of FIG. 4 at another viewing angle.
Figure 6:
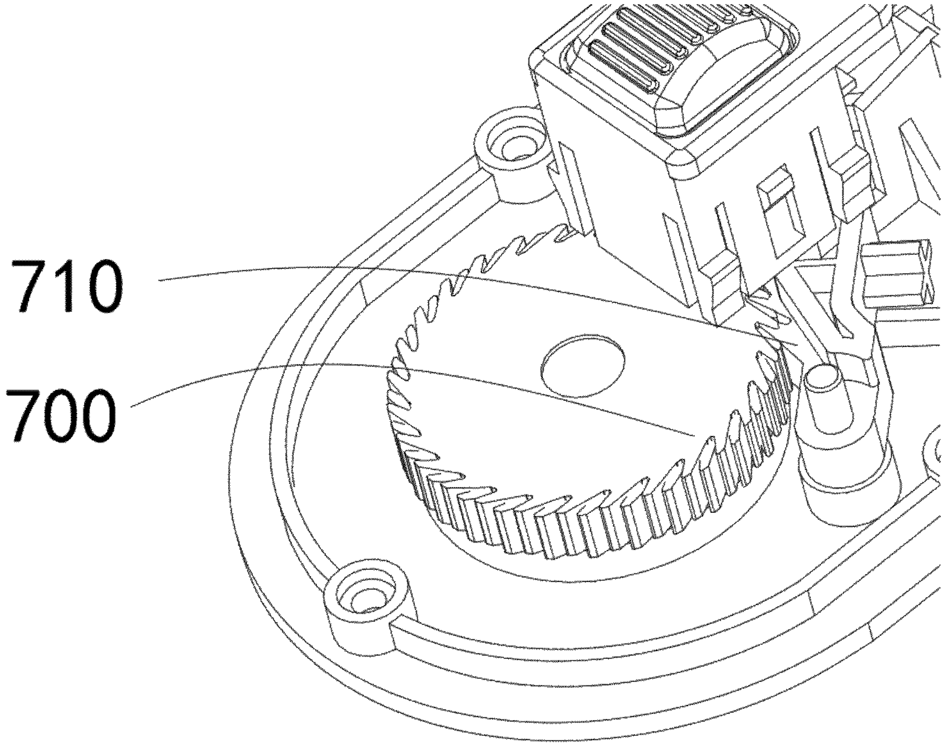
FIG. 6 is a schematic diagram of an engaging state of a gear and a toothed structure provided by the disclosure.
Figure 7:
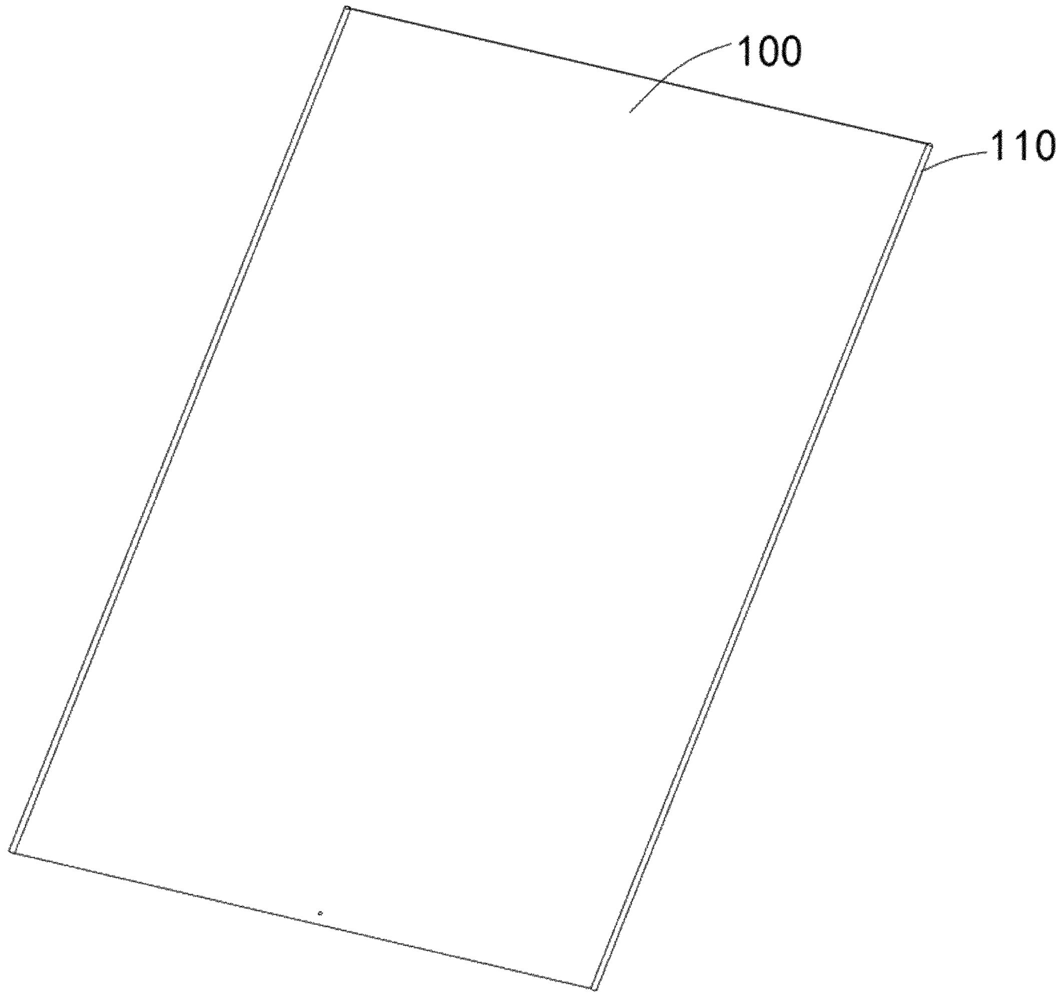
FIG. 7 is a schematic structural diagram of gate fabric provided by the disclosure.
Figure 8:
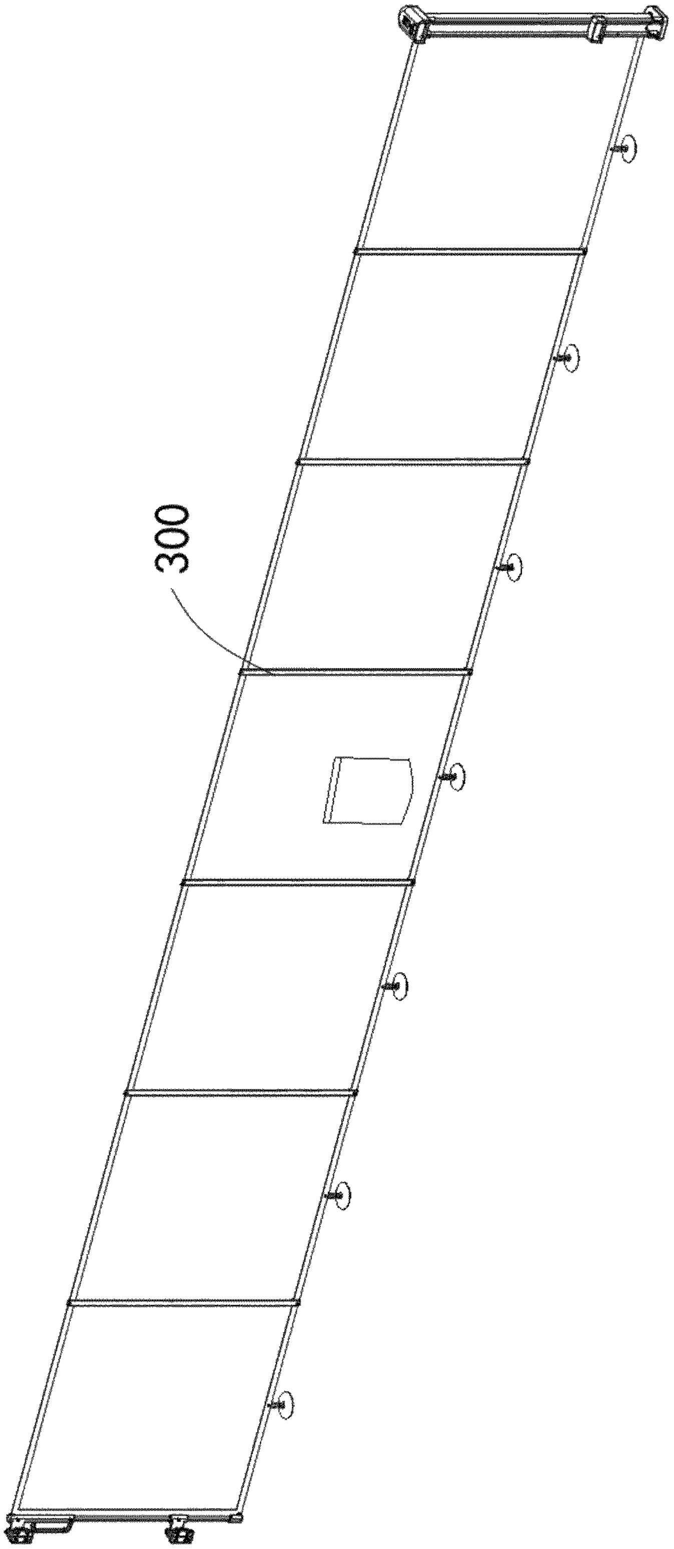
FIG. 8 is a schematic diagram of gate fabric provided by the disclosure in a spliced state.
Figure 9:
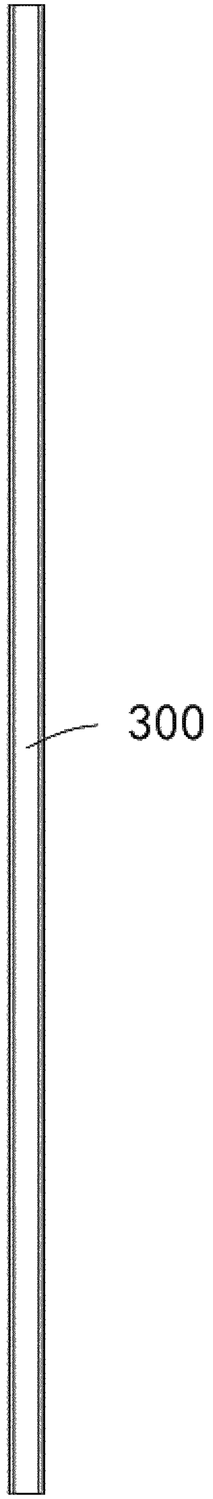
FIG. 9 is a schematic structural diagram of a splicing rod provided by the disclosure.
Figure 10:
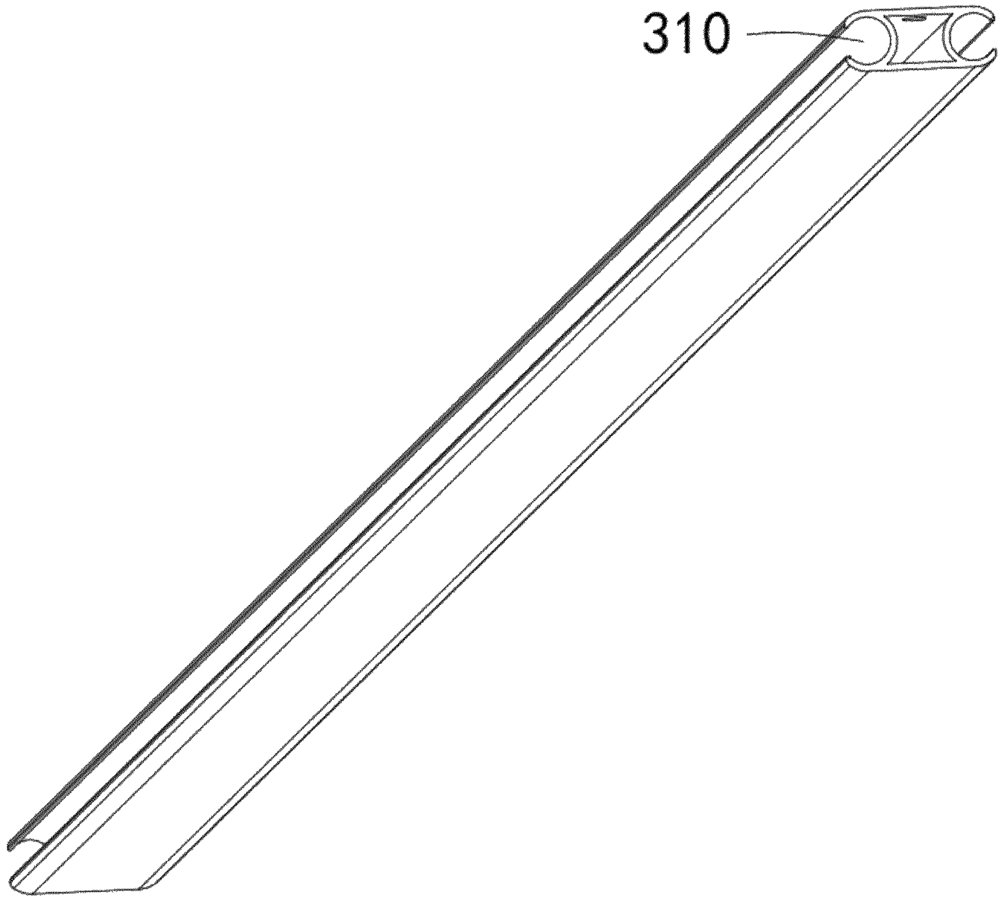
FIG. 10 is a schematic structural diagram of FIG. 9 at another viewing angle.
Figure 11:
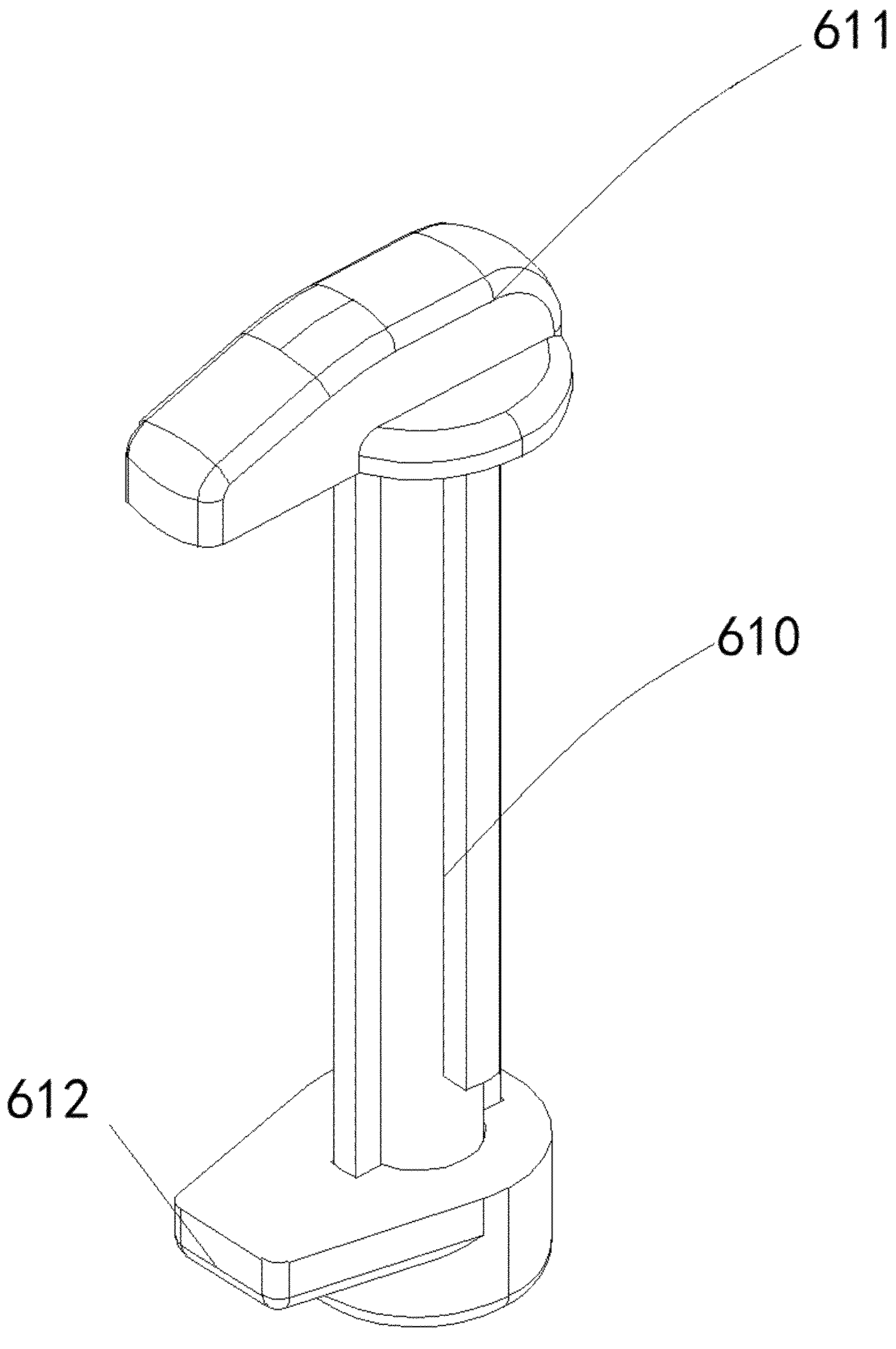
FIG. 11 is a schematic structural diagram of a connection between a rotating handle and a lock sheet provided by the disclosure.
Figure 12:
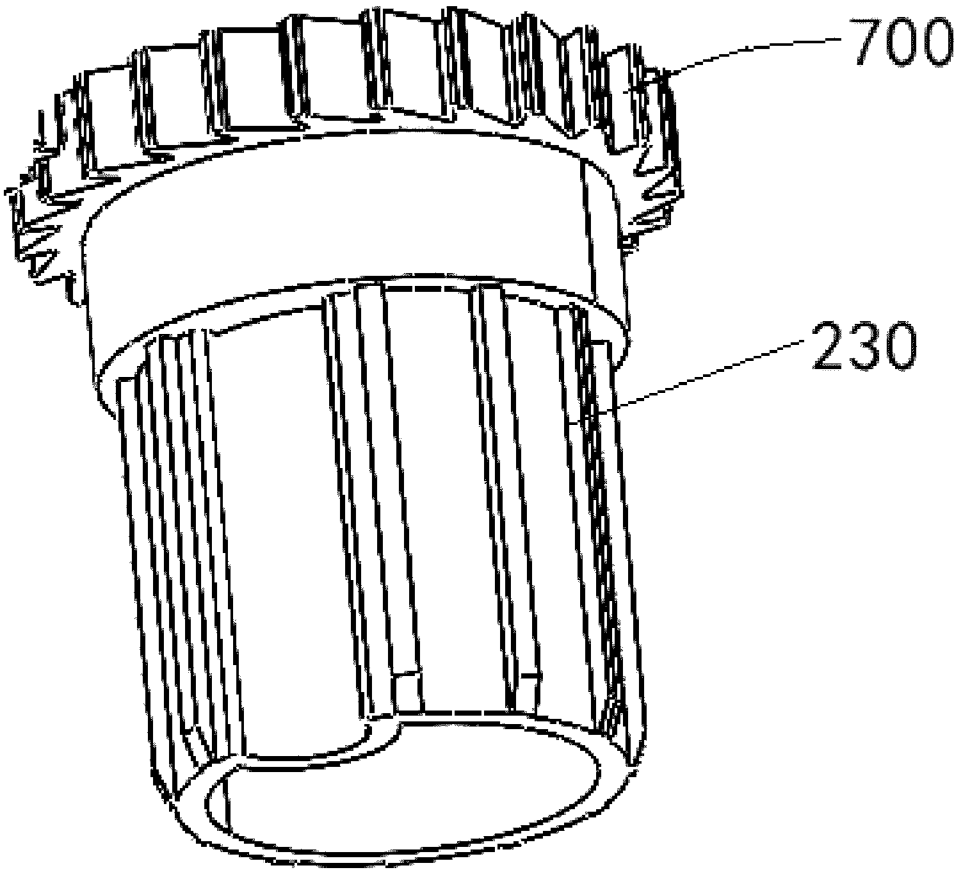
FIG. 12 is a schematic diagram of a connection between a rolling shaft and a gear provided by the disclosure.
Figure 13:
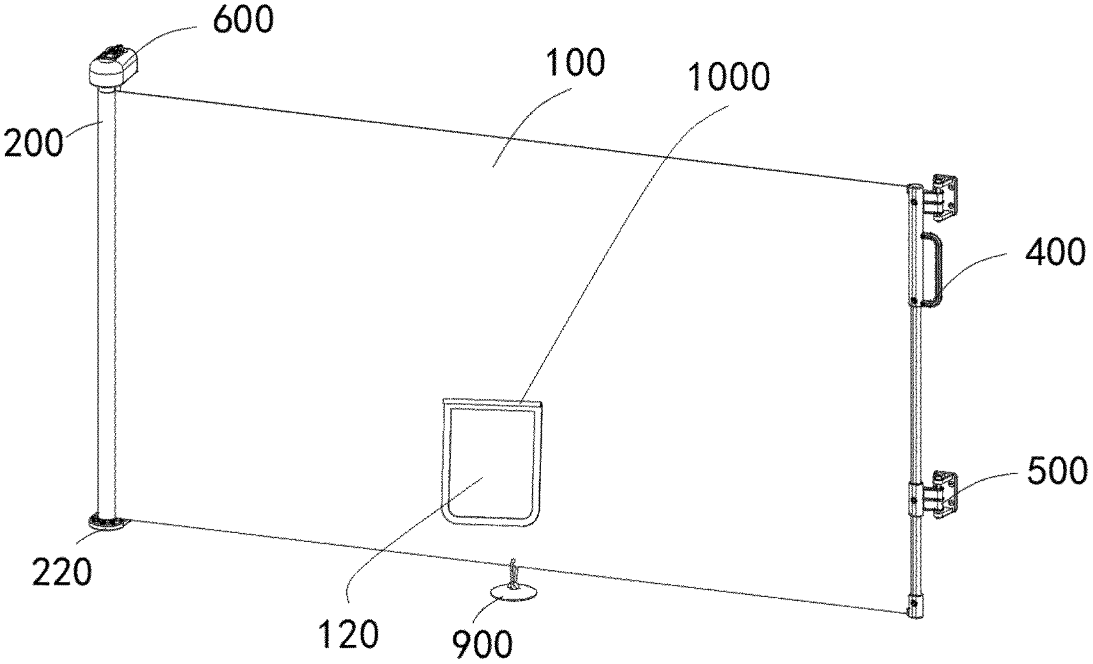
FIG. 13 is a schematic structural diagram (with a pet hole) of a single piece of gate fabric provided by the disclosure.

As shown in FIGS. 1-13, a retractable baby gate provided by the disclosure includes gate fabric 100, where the gate fabric 100 is made of a flexible material, the gate fabric 100 is rectangular, is rolled when not used, and is stored in a roller 200; a rolling shaft 230 is arranged in the roller 200, one end of the gate fabric 100 is fixedly connected to the rolling shaft 230 and the other end thereof winds the periphery of the rolling shaft 230 in a rolled shape, a longitudinal opening 210 is formed in a peripheral surface of the roller 200, the length of the longitudinal opening 210 is consistent with the height of the gate fabric 100, so that the opening 210 extends at the edge of the gate fabric 100, a splicing rod 300 is connected to an edge of the side, and a handle 400 and a fixed seat 500 are mounted on the periphery of the splicing rod 300. When the gate fabric 100 is used, the handle 400 is pulled to drive the gate fabric 100 to gradually extend from the opening 210 to the other side, i.e., a fixed surface to be fixed, and is fixedly connected to the fixed surface on the corresponding side through the fixed seat 500, so that the retractable gate is mounted. Preferably, the gate fabric 100 is made of a fabric material, which is convenient to draw, long in service life, and production cost-saving. Preferably, there are two fixed seat 400, arranged in a vertical direction of the splicing rod 300 and respectively located at an upper position and a lower position of the splicing rod 300, thereby improving the connecting stability with the fixed surface.

Specifically, the roller 200 is a hollow cylinder, a control portion that controls the rolling shaft 230 inside the roller to move is arranged at the upper end of the roller, a base 220 is arranged at the lower end corresponding to the upper end, and the base 220 is fixed to the horizontal plane. The rolling shaft 230 and the roller 200 are arranged coaxially, the rolling shaft 230 rotates clockwise to release the gate fabric 100 to pull the gate fabric 100 to an appropriate length, and the rolling shaft 230 is locked by the control portion to prevent the rolling shaft from rotating continuously; and the rolling shaft 230 rotates anticlockwise to retract the gate fabric 100 and the gate fabric 100 winds the peripheral surface of the rolling shaft. The rolling shaft 230 rotates clockwise or anticlockwise to retract and release the gate fabric 100.

Specifically, the control portion includes a hollow shell 600. A connecting rod 610 penetrating through upper and lower surfaces is arranged in the shell 600. A rotating handle 611 is connected to the top of the connecting rod 610. A lock sheet 612 is integrally formed at the bottom. A projection extending horizontally in a direction away from the center of the lock sheet is formed on the periphery of the lock sheet 612. The projection is overlapped in a groove formed in a gate frame or the fixed surface or matching the projection. The position of the shell 600 is fixed, and the rotating handle 611 is rotated, so that the connecting rod 610 drives the lock sheet 612 to rotate. When it is needed to fix the shell 600, the projection position of the lock sheet 612 is screwed to the groove, so that the projection is embedded into the groove, and the shell 600 is fixed. When it is needed to detach the gate, the rotating handle 611 is rotated reversely, and the connecting rod 610 drives the projection of the lock sheet 612 to be separated from the groove. In order to improve the connecting stability of the shell 600, a screw hole may also be formed in a surface of the shell 600 facing a mounting fixed surface, and the shell 600 and the mounting fixed surface are fixedly connected through screws.

A gear 700 coaxially connected to the rolling shaft 230 is further arranged in the shell 600. A toothed structure 710 capable of engaging with the gear 700 is arranged on one side of the gear 700. The toothed structure 710 is of a long curved plate-like structure. One side of the toothed structure 710 away from the engaging end is rotationally connected to a bottom surface of the shell 600. A switch 800 that controls the toothed structure to rotate is connected to an upper surface of the toothed structure 710. The switch 800 is toggled to control the toothed structure 710 to rotate along a turning point between the toothed structure and the shell 600 to be close to or away from the gear 700, so as to achieve engagement or disconnection between the toothed structure 710 and the gear 700. The switch 800 is arranged above the shell 600. A stopper 810 is arranged at the bottom of the switch 800. A barrier plate 720 is arranged at the top of the toothed structure 710. One end of the barrier plate 720 extends horizontally to exceed a sawtooth starting end surface of the toothed structure 710. The stopper 810 falls to be in contact with a side surface of the barrier plate 720 to drive the barrier plate 720 to rotate in a direction away from the gear 700, so as to prevent the toothed structure 710 from engaging with the gear 700. The switch 800 is toggled to an unlocked position, and the stopper 810 connected to the switch toggles the barrier plate 720 to drive a sawtooth of the toothed structure 710 to be separated from the gear 700. The switch 800 is toggled reversely, the barrier plate 720 loses an external force action, and the toothed structure 710 rotates reversely along a turning point thereof till a sawtooth of the toothed structure engages with the gear 700. Specifically, a spring is arranged between the barrier plate 720 and an inner wall of the shell 600. In an unlocked state of the switch 800, the spring is in a compressed state. The switch 800 is locked, and the spring is restored to a normal uncompressed state to push the barrier plate 720 and the toothed structure 710 together to rotate toward the side of the gear 700, so that the toothed structure 710 engages with the gear 700. When it is needed to draw the gate fabric 100, the switch 800 is toggled to the unlocked position, and the toothed structure 710 is disconnected from the gear 700, so that the gate fabric 100 may be pulled smoothly. When the gate fabric is drawn to a needed length, the switch 800 is toggled reversely, the toothed structure 710 and the gear 700 engage and are locked, and the rolling shaft 230 coaxially connected to the gear 700 no longer rotates, so that the length of the gate fabric 100 will not change.

In the embodiments of the present application, another piece of gate fabric 100 may be spliced to the splicing rod 300. A connecting portion 110 matching the splicing rod 300 is formed at a splicing edge of the gate fabric 100, and the connecting portion 110 is connected to the splicing rod 300. Two adjacent pieces of gate fabric 100 are spliced. A splicing rod 300 is also arranged at an edge of the gate fabric 100 close to the mounting fixed surface, and a handle 400 and a fixed seat 500 are mounted on the periphery of the splicing rod 300, so that the fabric gate is fixed to the mounting fixed surface. The handle 400 and the fixed seat 500 each are provided with a sleeving groove, and the sleeving grooves are fixed on the periphery of the splicing rod 300 in a sleeved manner.

Specifically, the columnar connecting portion 110 is integrally formed at edges of left and right sides of the gate fabric 100. The height of the connecting portion 110 corresponds to the height of the gate fabric 100. Correspondingly, the splicing rod 300 is provided with two symmetrically formed clamping cavities 310, which are respectively used for clamping the connecting portions 110 of splicing units on the corresponding sides, so as to splice two pieces of gate fabric 100 into an integrated structure. A top section of each of the clamping cavities 310 is in an opened circular shape. The bottom of the connecting portion 110 corresponds to the top opening of the clamping cavity 310 first to pull the gate fabric 100 downward, so as to drive the bottom of the connecting portion 110 to be close to the bottom of the clamping cavity 210 till they are on the same plane. In the pulling process, the opening clamps an intersecting line between the connecting portion 110 and a main body of the gate fabric 100. It is illustrated herein that the section of the connecting portion 110 may be round, elliptical, square or in other shapes, and for the convenience of processing and production, the section of the connecting portion is preferably round. The shape of the cavity of the clamping cavity 310 matches the shape of the section of the connecting portion 110.

In order to prevent the bottom of the main body portion of the gate fabric 100 from crimping or upwarping, a sucking disc 900 adsorbed with the ground is arranged at the bottom of the main body portion of the gate fabric 100. The mounted sucking disc 900 absorbs the ground to play a role of drawing the main body portion of the gate fabric 100 downward, thereby preventing the bottom of the main body portion of the gate fabric 100 from crimping or upwarping. The sucking disc 900 may be replaced with a double-sided adhesive or a magnetic structure to fix the gate fabric 100 to the ground, which meets the safety requirement and may also prevent infants or pets from passing through the bottom of the gate fabric.

In the embodiments of the present application, a pet hole 120 is formed in the gate fabric 100, a check apron 1000 is arranged at the pet hole 120, the check apron 1000 is lowered to shield the pet hole 120, the check apron 1000 is rolled, the pet hole 120 appears, and blocked pets come in and go out from the pet hole 120. A rolled state of the check apron 1000 may be fixed through a fixing structure. The check apron 1000 is prevented from falling to shield the pet hole 120. The fixing structure may be a hook and a Velcro structure above the pet hole 120. The fixing structure is an existing structure, which is not repeatedly described herein. When the gate fabric 100 is selected, the gate fabric with the pet hole 120 or without the pet hole 120 may be selected as needed. At least one piece of gate fabric 100 with the pet hole 120 is selected.

In the embodiments of the present application, a reinforcing rod 620 is arranged between the base 220 and the shell 600. A fixed seat 500 is mounted on the reinforcing rod 620. The fixed seat 500 is provided with a threaded hole. A screw is inserted into the threaded hole to fixedly connect the fixed seat 500 and the mounting fixed surface, so that the mounting stability between the roller side and the mounting fixed surface is improved.

During use, an appropriate number of gate fabric 100 is selected according to the width of the gate frame opening, and the gate fabric is spliced into an integrated structure through the splicing rods 300. Then, the gate fabric is fixed to the mounting fixed surface through the fixed seat 500 and/or shell 600 on both sides to mount the fabric gate. After the fabric gate is mounted, the sucking disc 900 absorbs the ground, so that the fabric gate is further stably reinforced.

Although the embodiments of the disclosure have been shown and illustrated, those of ordinary skill in the art may understand that various changes, modifications, replacements, and variations may be made on these embodiments without departing from the principle and spirit of the disclosure. The scope of the disclosure is defined by the appended claims and equivalents thereof.

The invention claimed is:

1. A retractable baby gate, comprising:

a first gate fabric and a second gate fabric adjacent to the first gate fabric;

a roller, being a hollow cylinder and mounted on one side of the first gate fabric, wherein a rolling shaft is coaxially arranged in the roller, one end of the first gate fabric is fixed to the rolling shaft and winds the periphery of the rolling shaft, a longitudinal opening through which the first gate fabric comes in and goes out is formed in a peripheral surface of the roller, a shell is fixedly connected to an upper end of the roller, and a base fixedly connected to a mounting fixed surface is connected to a lower end of the shell; and a plurality of splicing rods, a first one of the splicing rods being connected to an edge of one side of the first gate fabric away from the roller, wherein a handle and two fixed seats are mounted on a periphery of a second one of the splicing rods; and the two fixed seats are arranged in a vertical direction of the second splicing rod and respectively located at an upper position and a lower position of the second splicing rod; wherein the first splicing rod is provided with two symmetrically formed clamping cavities for clamping the first gate fabric and the second gate fabric on the corresponding sides respectively, so as to splice the first gate fabric and the second gate fabric into an integrated structure;

a connecting portion, cooperating with the clamping cavities, formed at an edge of one side of the first gate fabric, wherein the connecting portion is connected to the first splicing rod;

a control portion, arranged in the shell to control rotation and locking of the rolling shaft, wherein the control portion comprises a gear coaxially connected to the rolling shaft, a toothed structure capable of engaging with the gear is arranged on one side of the gear, one end of the toothed structure is rotationally connected to a bottom surface of the shell at a coupling point, and the toothed structure rotates relative to the coupling point toward or away from the gear, wherein the control portion is arranged at the upper end of the roller;

a connecting rod, penetrating through an upper surface and the bottom surface of the shell and being arranged in the shell, wherein a rotating handle is connected to a top of the connecting rod; a lock sheet is integrally formed at a bottom of the connecting rod; a projection extending horizontally in a direction away from a center of the lock sheet is formed on the periphery of the lock sheet;

wherein the shell is coupled to a gate frame or fixed surface by rotating the rotating handle, which drives the connecting rod and the lock sheet to rotate, such that the projection of the lock sheet engages a groove of the gate frame or fixed surface; and the shell is detached from the gate frame or fixed surface by rotating the rotating handle reversely, thereby separating the projection of the lock sheet from the groove;

a reinforcing rod, arranged between the base and the shell, wherein a third fixed seat is mounted on the reinforcing rod; wherein the third fixed seat is provided with a threaded hole; a screw is inserted into the threaded hole to fixedly connect the third fixed seat to the gate frame or fixed surface;

a switch, controlling the toothed structure to rotate and being connected to an upper surface of the toothed structure, wherein the switch is toggled to control the toothed structure to rotate about the coupling point between the toothed structure and the shell to move toward or away from the gear, so as to engage or disengage the gear; and the switch is arranged above the shell;

a stopper, arranged at a bottom of the switch;

a barrier plate, arranged at the upper surface of the toothed structure, wherein one end of the barrier plate extends horizontally past a sawtooth starting end surface of the toothed structure; the stopper extends to be in contact with a side surface of the barrier plate to drive the barrier plate to rotate; wherein when the switch is toggled to an unlocked position, the stopper engages the barrier plate to drive the toothed structure to be separated from the gear, and when the switch is toggled reversely to a locked position, the toothed structure rotates reversely about the coupling point until the toothed structure engages with the gear;

wherein when the toothed structure engages with the gear, the rolling shaft is locked and prevented from rotating, and when the toothed structure is separated from the gear, the rolling shaft is allowed to rotate to release or retract the first gate fabric.

2. The retractable baby gate according to claim 1, wherein a fixing part fixed with the ground is arranged at a bottom of the first gate fabric.

3. The retractable baby gate according to claim 2, wherein at least one pet hole is formed in the first gate fabric, a check apron is arranged at the pet hole, the check apron is lowered to shield the pet hole, the check apron is rolled to allow passage through the pet hole.

4. The retractable baby gate according to claim 3, wherein the fixing part is a suction disc, a magnetic structure or a double-sided adhesive.

5. The retractable baby gate according to claim 1, wherein a spring is arranged between the barrier plate and an inner wall of the shell; wherein in the unlocked position of the switch the spring is in a compressed state, and in the locked position the spring is restored to a normal uncompressed state to push the barrier plate and the toothed structure together to rotate toward the side of the gear, so that the toothed structure engages with the gear; wherein to extend the first gate fabric, the switch is toggled to the unlocked position and the toothed structure is disconnected from the gear so that the first gate fabric can be pulled; and when the first gate fabric is extended to a desired length, the switch is toggled reversely so that the toothed structure and the gear engage and are locked, and the rolling shaft coaxially connected to the gear is fixed.

* * * * *